United States Patent
Kirn

(10) Patent No.: US 7,466,770 B2
(45) Date of Patent: Dec. 16, 2008

(54) ADAPTIVE PULSE WIDTH DISCRIMINATION USING AN ASYNCHRONOUS CLOCK

(75) Inventor: Larry Kirn, East Lansing, MI (US)

(73) Assignee: JM Electronics Ltd. LLC, Wilmington, DE (US)

( * ) Notice: Subject to any disclaimer, the term of this patent is extended or adjusted under 35 U.S.C. 154(b) by 680 days.

(21) Appl. No.: 10/912,211

(22) Filed: Aug. 5, 2004

(65) Prior Publication Data

US 2005/0069053 A1  Mar. 31, 2005

Related U.S. Application Data

(60) Provisional application No. 60/492,708, filed on Aug. 5, 2003.

(51) Int. Cl.
*H03D 1/00* (2006.01)

(52) U.S. Cl. .................................. 375/340; 375/316
(58) Field of Classification Search ................ 375/340, 375/316; 329/312
See application file for complete search history.

(56) References Cited

U.S. PATENT DOCUMENTS

| | | | | |
|---|---|---|---|---|
| 3,676,699 A | * | 7/1972 | Warren | 327/34 |
| 3,737,632 A | * | 6/1973 | Barnes | 235/462.19 |
| 3,760,412 A | * | 9/1973 | Barnes | 341/53 |
| 4,065,765 A | * | 12/1977 | Wagner | 341/53 |
| 5,905,406 A | * | 5/1999 | Sugden et al. | 329/312 |
| 2001/0055323 A1 | * | 12/2001 | Rowett et al. | 370/537 |

* cited by examiner

Primary Examiner—Juan A Torres
(74) Attorney, Agent, or Firm—Dorsey & Whitney LLP

(57) ABSTRACT

A system and method are directed to measuring incoming transition widths by counting asynchronous clock pulses, deriving a reference shortest validated width, and using the shortest validated width for comparison in discriminating further incoming pulse widths.

16 Claims, 1 Drawing Sheet

ADAPTIVE PULSE WIDTH DISCRIMINATION USING AN ASYNCHRONOUS CLOCK

REFERENCE TO RELATED APPLICATION

This application claims priority from U.S. Provisional Patent Application Ser. No. 60/492,708, filed Aug. 5, 2003, the entire content of which is incorporated herein by reference.

FIELD OF THE INVENTION

This invention relates generally to asynchronous serial data modulation and demodulation and, in particular, apparatus and methods for discriminating transition width across a broad frequency range without use of a synchronous clock.

BACKGROUND OF THE INVENTION

Many asynchronous serial data modulation schemes are reliant upon pulse width (RZ—return to zero) or state width (NRZ—no return to zero) modulation. The most common modulation schemes rely upon discrimination between two or more pulse or state widths related by a specified multiplicative factor 'n'. In order to demodulate such data streams, it has been common practice to extract a clock signal from the data stream with a period equal to, or an integer fraction of, the shortest transition width. For robust demodulation, this extracted clock signal must be phase locked to the data stream, which usually indicates the use of a phase-locked loop (PLL) design. Not only do PLLs bring complexity and additional cost to demodulator designs, they almost always employ fixed-frequency filters, and their performance is inversely proportional to bandwidth. This precludes their use in frequency-agile designs. There exists a need of a simple demodulation method for asynchronous serial data which facilitates wide frequency ranges.

SUMMARY OF THE INVENTION

The present invention resides in the method of measuring incoming transition widths by counting asynchronous clock pulses, deriving a reference based upon a shortest validated width, and using the shortest validated width for comparison in discriminating further incoming pulse widths.

DETAILED DESCRIPTION OF THE INVENTION

Figure 1:
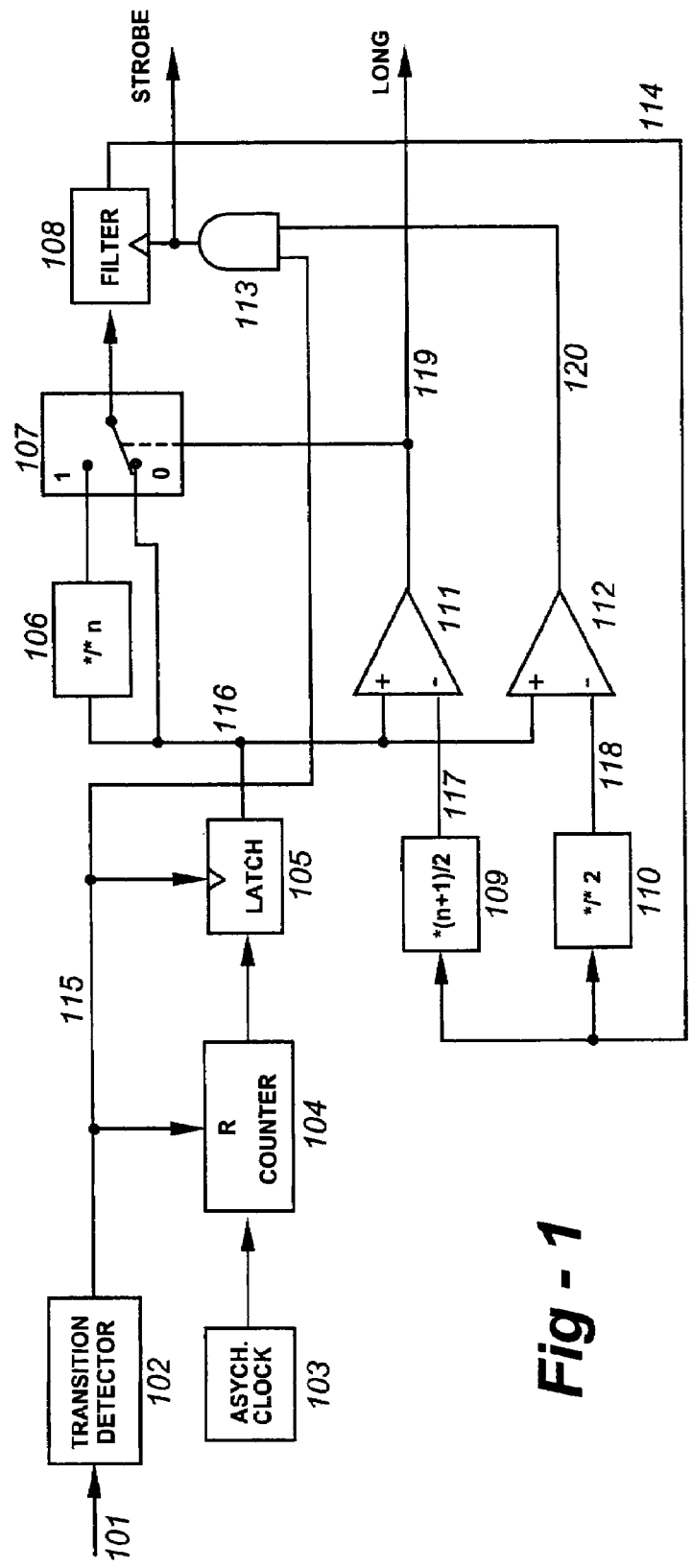
FIG. 1 shows a block diagram of a binary preferred embodiment of the present invention demodulating a NRZ data stream.

Referring now to FIG. 1, transition detector 102 is driven by incoming asynchronous serial data stream 101, and outputs a narrow pulse 115 at each transition. UP counter 104 is clocked by asynchronous clock 103, presumably of a period one half or less that of the minimum incoming transition width 101 expected. At each transition of incoming data stream 101, pulse 115 simultaneously latches the current value of the UP counter 104 in latch 105, and resets it in preparation for measuring the next pulse width. The output of latch 105 resultantly is a measure in asynchronous clock 103 pulses of the last incoming transition width, or period, shown as transition width signal 115.

Transition width signal 115 is applied to comparator 111 for comparison with a calculated reference 117, described below, to yield an output 119 which indicates the relative width of the last transition width. Transition width 115 is also applied to comparator 112 for comparison with another calculated reference 118, also described below, to yield an output 120 which indicates that the last transition width was of sufficient length to be valid.

The output 119 of comparator drives a switch 107 which supplies either the incoming transition width 116, when a long incoming transition width is not indicated by comparator 111; or the incoming transition width 116 divided by n (supplied by divider 106) when a long incoming transition width is indicated by comparator 111, to averaging filter 108.

The foregoing scheme ensures that short transition widths are directly input to filter 108, and long transition widths are divided by n before input to filter 108. Filter 108 is updated by AND gate 113, from the simultaneous condition of detected transition pulse 115 and validated transition width 120. Filter 108 resultantly outputs the average short transition width 114.

Average short transition width 114 is divided by two by divider 110 and supplied as reference input to comparator 112, which resultantly indicates that the incoming transition width 116 is above one-half the average short transition width 114. Comparator 112 thus provides protection against glitches on incoming serial data stream 101.

Average short transition width signal 114 is multiplied by $((n+1)/2)$ by multiplier 109, and supplied as reference input to comparator 111, which resultantly indicates that the incoming transition width 116 is above one-half the difference between the average short transition width 114 and the average short transition width 114 times n. Comparator 111 thus provides short or long transition width indication 119, which is strobed as demodulated data by the output of AND gate 113, which indicates a transition (115) with a validated minimum width (120).

A circuit incorporating the present invention robustly discriminates transition width across a broad frequency range, without use of a synchronous clock. Implementations employing differing physical width indications, and/or number of states are anticipated.

I claim:

1. A method of demodulating asynchronous serial data, the method comprising:
   receiving an asynchronous serial data stream for demodulation, wherein the asynchronous serial data stream has a plurality of pulse widths, wherein each pulse width occurs between a respective pair of successive signal transitions in the asynchronous serial data stream, and wherein each signal transition is a change from one signal level to another signal level;
   measuring the length of each of the pulse widths by counting clock pulses for a duration of time between the respective pair of successive signal transitions;
   demodulating the received asynchronous serial data stream using a reference pulse width based on a shortest of the plurality of pulse widths, the demodulating comprising determining whether each of the plurality widths is a short or a long pulse width based on the reference pulse width; and
   adjusting the reference pulse width using at least some of the measured pulse widths.

2. The method of claim 1, further comprising determining whether each of the measured pulse widths is usable for adjusting the reference pulse width.

3. The method of claim 2, wherein said adjusting the reference pulse width comprises adjusting the reference pulse width using each of the measured pulse widths determined to be valid.

4. A system for demodulating asynchronous serial data, the system comprising:

a transition detector configured to receive an asynchronous serial data stream having a plurality of pulse widths, wherein each pulse width occurs between a respective pair of successive signal transitions in the asynchronous serial data stream, and wherein each signal transition is a change from one signal level to another signal level;

a counter coupled to the transition detector and configured to measure the length of each of the pulse widths by counting clock pulses for a duration of time between the respective pair of successive signal transitions;

a comparator coupled to the counter and configured to compare the measured pulse widths with a reference pulse width used to demodulate the asynchronous serial data stream, wherein the reference pulse width is based on a shortest of the plurality of pulse widths, and wherein the comparison is used to determine whether each of the measured pulse widths is a short or a long pulse width and whether each of the measured pulse widths are usable for adjusting the reference pulse width; and circuitry coupled to the comparator and configured to adjust the reference pulse width using at least some of the measured pulse widths.

5. The system of claim 4, wherein the circuitry is further configured to adjust the reference pulse width using those measured pulse widths that are determined to be valid for adjusting the reference pulse width.

6. A method of adaptive pulse width discrimination for an asynchronous serial data stream, the method comprising:

deriving a plurality of pulse widths using a clock signal, wherein each pulse width represents a time period between a respective pair of successive signal transitions in the asynchronous serial data stream, and wherein each signal transition is a change from one signal level to another signal level;

determining whether the pulse width is valid with respect to a reference width, wherein the reference width correspond to a shortest of the plurality of pulse widths;

determining whether the pulse width is a short or long pulse width based on the reference width; and adjusting the reference width using the pulse width when the pulse width is valid.

7. The method of claim 6, wherein said deriving a plurality of pulse widths comprises counting, for each pulse width, a number of pulses in the clock signal between the respective pair of successive signal transitions in the asynchronous serial data stream.

8. The method of claim 6, wherein said determining whether the pulse width is valid comprises comparing the pulse width to a fraction of the reference width to determine whether the pulse width is of sufficient length relative to the reference width.

9. The method of claim 6, wherein said adjusting the reference width comprises adjusting the reference width using each incoming pulse width that is valid.

10. The method of claim 6, wherein said adjusting the reference width comprises adjusting the reference width using the pulse width when the pulse width is longer than the reference width.

11. A method of discriminating between a plurality of different types of pulse widths in an asynchronous non-return-to-zero data stream including a relatively short pulse width and a relatively long pulse width to demodulate the asynchronous non-return-to-zero data stream, the method comprising:

measuring a width between successive transitions in each of a plurality of pairs of signal transitions of the asynchronous non-return-to-zero data stream, wherein each transition represents a change from one signal level to another signal level;

comparing the measured widths to a reference signal representing the width of the relatively short pulse width;

determining whether each pulse width is a short or a long pulse width based on the reference signal; and modifying the reference signal based on the measured widths that are determined to be valid.

12. The method of claim 11, wherein said comparing the measured widths to the reference signal comprises multiplying the reference signal by a multiplication factor and comparing each measured width to the multiplied reference signal.

13. The method of claim 11, wherein said modifying the reference signal comprises modifying the reference signal using each measured width when the comparison indicates the measured width is a relatively short pulse width.

14. The method of claim 11, wherein said modifying the reference signal comprises dividing each measured pulse width by a factor when the comparison indicates the measured pulse width is a relatively long pulse width and then modifying the reference signal using the divided measured pulse width.

15. The method of claim 14, wherein the factor is derived from a number of the different pulse widths in the asynchronous non-return-to-zero data stream.

16. The method of claim 11, wherein the reference signal is divided in half before being compared to the measured widths and the halved reference signal is then used for said comparing, and wherein said modifying the reference signal occurs when the measured width is greater in width than the halved reference signal.

* * * * *